United States Patent
Chaudhri et al.

(10) Patent No.: US 8,131,304 B2
(45) Date of Patent: *Mar. 6, 2012

(54) DYNAMIC SPECTRUM ALLOCATION (DSA) IN A COMMUNICATION NETWORK

(75) Inventors: Apoorv Chaudhri, Cambridge, MA (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/414,642

(22) Filed: Mar. 30, 2009

(65) Prior Publication Data

US 2010/0248631 A1   Sep. 30, 2010

(51) Int. Cl.
  *H04W 72/00*   (2009.01)
(52) U.S. Cl. .................. 455/450; 455/452.1; 455/452.2
(58) Field of Classification Search .................. 455/450, 455/452.1, 452.2; 370/329
  See application file for complete search history.

(56) References Cited

U.S. PATENT DOCUMENTS 6,982,969 B1 * 1/2006 Carneal et al. ................ 370/329
7,020,106 B2   3/2006 Barnard et al.
(Continued)

FOREIGN PATENT DOCUMENTS
WO   WO2007020292 A1   2/2007

OTHER PUBLICATIONS

International Patent Application No. PCT/US2010/027271—Search Report with Written Opinion, mailed Nov. 2, 2010—8 pages.

*Primary Examiner* — Hai L Nguyen
(74) *Attorney, Agent, or Firm* — Barbara R. Doutre (57) ABSTRACT

A method of dynamically allocating RF communication channels to a wireless communication device (102). A plurality of dynamic spectrum allocation (DSA) channels (222, 224) can be identified. The DSA channels can be channels that are available to a non-incumbent user to be used for RF communications. Based on at least one required channel parameter, a DSA channel can be selected as a first channel to allocate to the wireless communication device. At least a second channel can be selected to allocate to the wireless communication device based on a spectral relationship between the first channel and the second channel to ensure that the first and second channels are separated by at least a minimum required frequency separation (216).

20 Claims, 4 Drawing Sheets

U.S. PATENT DOCUMENTS

| | | | |
|---|---|---|---|
| 7,764,967 B2 * | 7/2010 | Kim et al. | 455/450 |
| 7,937,101 B2 * | 5/2011 | Corke et al. | 455/516 |
| 8,000,715 B2 * | 8/2011 | Melpignano et al. | 455/451 |
| 2006/0083205 A1 | 4/2006 | Buddhikot et al. | |
| 2006/0084444 A1 | 4/2006 | Kossi et al. | |
| 2007/0104140 A1 | 5/2007 | Ashish et al. | |
| 2008/0107095 A1 | 5/2008 | Black et al. | |
| 2008/0240024 A1 | 10/2008 | Rao et al. | |
| 2008/0259859 A1 | 10/2008 | Cordeiro et al. | |
| 2009/0054095 A1 | 2/2009 | Corke et al. | |

* cited by examiner

```
┌─────────────────────────────────┐
│ Receive a list of a plurality of DSA │
│ channels that are available to a non- │
│ incumbent user to be used for RF │
│ communications                  │
│                             502 │
└─────────────────────────────────┘
                │
                ▼
┌─────────────────────────────────┐
│ Scan the plurality of the DSA channels │
│ to generate scan results that indicate │
│ which of the plurality of DSA channels │
│ are presently unoccupied        │
│                             504 │
└─────────────────────────────────┘
                │
                ▼
┌─────────────────────────────────┐
│ Communicate the scan results to a │
│ cognitive radio controller that │
│ implements cognitive channel    │
│ allocation                      │
│                             506 │
└─────────────────────────────────┘
                │
                ▼
┌─────────────────────────────────┐
│ Receive an allocation of at least one of │
│ the DSA channels to be used as a first │
│ channel for RF communications, the │
│ DSA channel being selected based, at │
│ least in part, on the scan results and the │
│ DSA channel being separated from the │
│ at least a second channel by at least a │
│ minimum required frequency separation │
│                             508 │
└─────────────────────────────────┘
                │
                ▼
┌─────────────────────────────────┐
│ Receive at least a portion of inbound │
│ communication traffic on the first │
│ channel or the second channel   │
│                             510 │
└─────────────────────────────────┘
                │
                ▼
┌─────────────────────────────────┐
│ Transmit at least a portion of outbound │
│ communication traffic on the first │
│ channel or the second channel that is │
│ not being used for inbound      │
│ communication traffic.          │
│                             512 │
└─────────────────────────────────┘
```

FIG. 5

DYNAMIC SPECTRUM ALLOCATION (DSA) IN A COMMUNICATION NETWORK

BACKGROUND OF THE INVENTION

1. Field of the Invention

The present invention generally relates to wireless communications and, more particularly, to dynamic spectrum allocation (DSA) in a communication network.

2. Background of the Invention

With the continued proliferation of wireless communications and the increasing demand for wireless broadband access, the availability of frequency spectrums over which to communicate has become scarce. Accordingly, the National Telecommunications and Information Administration (NTIA) and the Federal Communications Commission (FCC) have been investigating opening up certain frequency bands to expand commercial use in these frequency spectrums. Moreover, both the NTIA and FCC also are inquiring into new technologies that may be implemented to increase the efficiency of frequency spectrum utilization.

One relatively new technology for increasing the utilization of communication frequency spectrums is cognitive radio. Cognitive radio is a paradigm for wireless communication in which either a network or a wireless network node changes its transmission or reception parameters to communicate efficiently while avoiding interference with other licensed and/or unlicensed users. This alteration of parameters may be based on the active monitoring of several factors in the radio environment, such as frequency spectrum usage, user behavior and network state.

With the advantages of cognitive radio in mind, the NTIA is considering provisions to allow the use of cognitive radio opportunistically on a secondary access basis for the 410 MHz to 420 MHz frequency spectrum. Similarly, the FCC is considering provisions to allow the use of cognitive radio opportunistically on a secondary access basis for the 470 MHz to 698 MHz frequency spectrum. When using a frequency spectrum opportunistically on a secondary access basis, the designated frequency spectrum must only be used when there is an opportunity to use the frequency spectrum without interfering with communications of incumbent users, especially primary or licensed users.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to dynamically allocating communication channels for RF communications. More particularly, the present arrangements provide a manner in which dynamic spectrum allocation (DSA) methods may be used in frequency-division duplex (FDD) mode while ensuring that the necessary frequency separation between transmit and receive channels is maintained to prevent crosstalk on those channels.

As used herein, the term "dynamic spectrum allocation channel," or more simply "DSA channel," means a communication channel that may be established by a DSA user in a frequency spectrum that is allocated to at least one incumbent user so long as use of the communication channel by a DSA user does not interfere with communications of the incumbent user(s) in that frequency spectrum. An "incumbent user," as used herein, is a user or other entity that is licensed to use the frequency spectrum, or a user (or other entity) that is otherwise granted rights as a primary user of the frequency spectrum.

A "DSA user," as used herein, is a user or other entity that is allowed to use, on an opportunistic basis, a frequency spectrum for which the user (or other entity) is not considered an incumbent user, so long as such use does not interfere with use of the frequency spectrum by an incumbent user. Nonetheless, a DSA user may be licensed or otherwise granted rights as a primary user in one or more other frequency spectrums. For example, a DSA user may be licensed to use a first frequency spectrum, and thus be considered an incumbent user in the first frequency spectrum. Meanwhile, the DSA user may opportunistically use a second frequency spectrum for which it is not considered an incumbent user.

As used herein, the term "primary communication channel," or more simply "primary channel," means a communication channel that is established in a frequency spectrum that is licensed to the user of the communication channel (i.e., a primary user), or a frequency spectrum in which the user is otherwise granted rights as a primary user of the frequency spectrum. In this regard, a channel in a particular frequency spectrum may be considered a primary communication channel to a first user that is licensed to use the frequency spectrum, and considered a DSA channel to a second user that is not licensed to use the frequency spectrum, but is allowed to use the frequency spectrum when such use will not interfere with use by the primary user.

Figure 1:
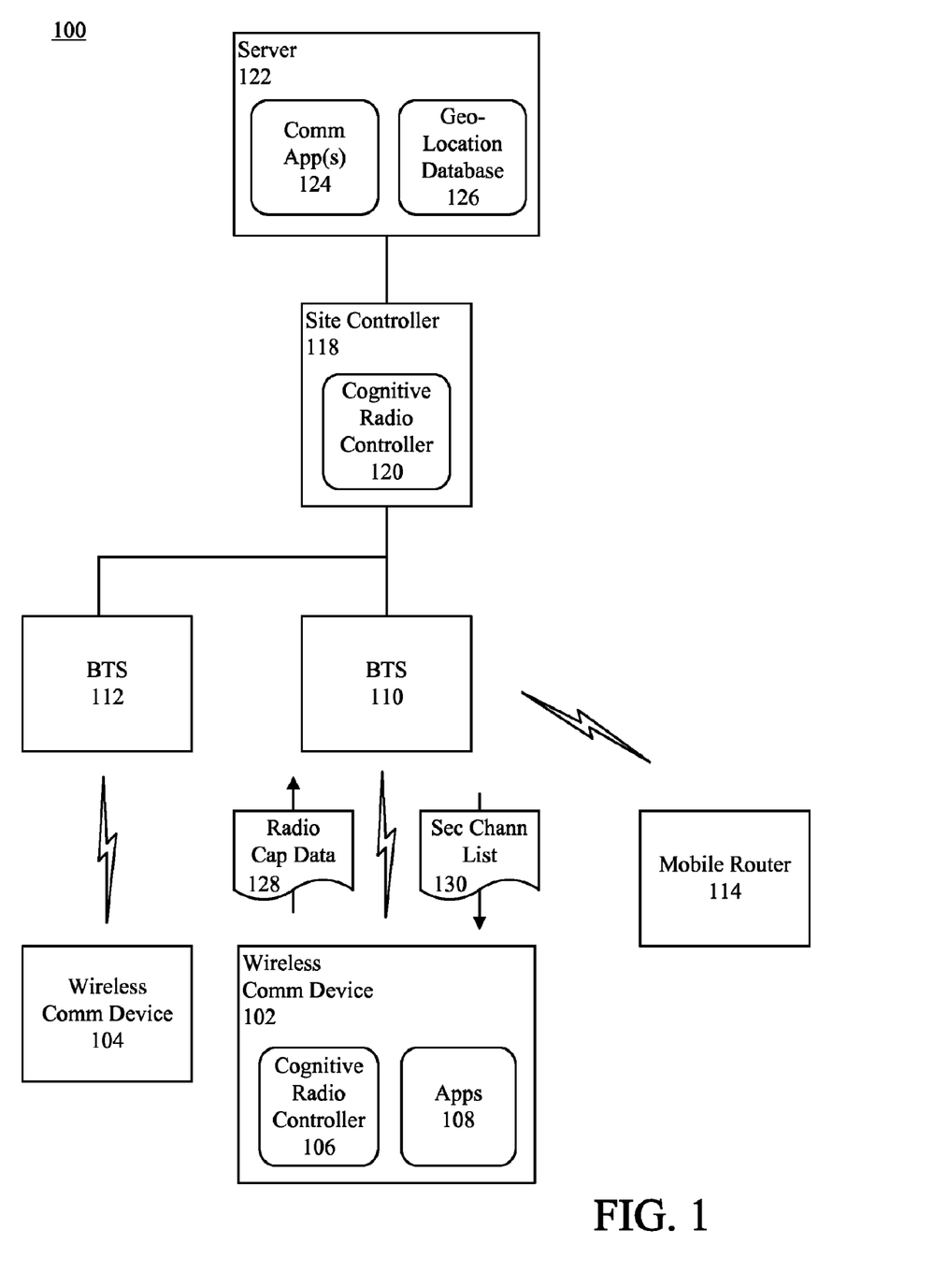
FIG. 1 depicts a communication system that is useful for understanding the present invention.

FIG. 1 depicts a DSA communication system 100 that is useful for understanding the present invention. The DSA communication system 100 can be configured to support communications in accordance with the Project 25 (P25) suite of standards (i.e., wireless communication for public safety), High Speed Data—TIA 902 (HSD), IEEE 802 wireless communications, for example, 802.11 and 802.16 (WiMAX), 3G, 4G, EUTRAN, UMB, WPA, WPA2, GSM, TDMA, CDMA, WCDMA, OFDM, LTE and/or direct wireless communication. Still, the invention is not limited in this regard and the system can be configured to communicate RF signals in accordance with any suitable communications standards, protocols, and/or architectures, or a suitable combination of such standards, protocols, and/or architectures.

The DSA communication system 100 can include one or more communication devices (hereinafter "communication devices") 102, 104. The communication devices can be mobile telephones, mobile radios, personal digital assistants, computers, mobile computers, mobile terminals, application specific devices, or any other devices that can transmit and/or receive wireless communication signals in accordance with one or more desired standards and/or protocols.

One or more of the communication devices, for example the communication device 102, can include a cognitive radio controller 106 that dynamically selects device transmission or reception parameters to allow for the use of DSA channels while avoiding interference with other licensed and/or unlicensed users, as will be discussed. In addition, one or more applications 108 can be instantiated on the communication device 102. For example, one or more client side public safety applications can be instantiated on the communication device 102. Examples of public safety applications can include, but are not limited to, P25 service applications and HSD service applications. The applications 108 can access the cognitive radio controller 106 to implement cognitive processing tasks.

The DSA communication system 100 also can include one or more base transceiver stations (BTSs) 110, 112 configured to wirelessly communicate with the communication devices 102, 104. In some arrangements, the DSA communication system 100 may include one or more mobile routers, such as a mobile router 114. The mobile router 114 can communicatively link the communication device 102 and/or the communication device 104 to other components of the DSA communication system 100, for example to the BTS 112 or to each other.

A site controller 118 can be provided to control operation of the BTSs 110, 112. The site controller 118 can be, for instance, a base station controller (BSC) that controls one or more BTSs 110. The site controller 118 can include a cognitive radio controller 120. The cognitive radio controller 120 can implement cognitive channel allocation to facilitate the selection of DSA channels available for use by communication devices 102, 104 and the mobile router 114, as will be described.

The DSA communication system 100 further may include a server 122. One or more applications can be instantiated on the server 122 to implement various server functions. For example, one or more communication applications 124 can be provided to process network communications in accordance with desired protocols and/or standards. In illustration, if the DSA communication system 100 supports public safety communications, server side public safety applications can be instantiated on the server 122.

The server 122 also can provide a geo-location database 126. The geo-location database 126 can identify DSA channels which are available for use in various geographic locations and radio access policies that are applicable to such use. The DSA channels that are available for use can be identified in a frequency allocation plan, which will be described herein. The radio access policies can include required channel parameters, for example frequency offsets, channel spacing, transmit mask, bandwidth, adjacent channel power ratio (ACPR), and any other policies that may be desired. In one arrangement, the radio access policies and frequency allocation plan can vary for different geographic regions, depending on the band plan, incumbent use of the frequency spectrum, geography, obstacles that interfere with signal propagation, and so on.

In operation, the cognitive radio controller 120 can implement cognitive channel allocation. As used herein, "cognitive channel allocation" is an allocation of DSA channels while avoiding interference with other licensed and/or unlicensed users operating in the same frequency spectrum(s) as the DSA channels.

During this process, the cognitive radio controller 120 can access radio access policies and a frequency allocation plan from the geo-location database 126. This information likely will not change frequently. Accordingly, the cognitive radio controller 120 need not continually update the information. Instead, the cognitive radio controller 120 can access the information periodically to check for any change in the information. For example, the cognitive radio controller 120 can retrieve the radio access policies and frequency allocation plan from the geo-location database on a daily basis, a monthly basis, a yearly basis, etc.

When a communication device 102 registers with a BTS 110, at the behest of the cognitive radio controller 106, the communication device 102 can communicate data 128 representing its radio capabilities to the BTS 110, which can forward the data 128 to the cognitive radio controller 120. The data 128 can include protocols supported by the communication device 102, supported bandwidth and RF capability (e.g., receiver desense, transmit masks, etc.), as well as other data pertaining to the configuration of the communication device 102. In one arrangement, the communication device 102 can communicate the data 128 over a trunking channel, although the invention is not limited in this regard and any other suitable licensed or unlicensed channel may be used.

A geographic region in which the communication device 102 is located also can be determined, for instance by the cognitive radio controller 120 and/or the communication device 102. The geographic region can be determined based on the location of the BTS 110, a global positioning system (GPS) associated with the communication device 102, a local positioning system, using a plurality of BTSs to implement trilateration, or the geographic region can be determined in any other suitable manner. In an arrangement in which the geographic region is determined by the communication device 102, the communication device 102 can communicate to the cognitive radio controller 120 coordinates identifying the geographic region. Again, the communication can be sent over a trunking channel or over any other suitable licensed or unlicensed channel.

The BTS 110 can communicate to the communication device 102 a list 130 of DSA channels that are potentially available for use by the communication device 102 as a non-incumbent user. For example, the cognitive radio controller 120 can provide an initial list 130 of DSA channels that might be available for secondary use in the geographic region. This information may be derived from the geo-location database 126 or via previous spectrum sensing periods. Once the initial list 130 is received by the communication device 102, the communication device 102 may scan the identified DSA channels and generate scan results that indicate which of the corresponding frequency spectrums are presently unoccupied.

In one arrangement, the cognitive radio controller 120 also can provide the list 130 of DSA channels to one or more other devices, for example to the communication device 104, the BTS 110 and/or the mobile router 114, and request that at least one of these devices scan the identified DSA channels to generate scan results. Regardless of which device or devices are tasked with scanning the DSA channels and generating the scan results, the scan results can be reported to the cognitive radio controller 120 using an inbound signaling packet (ISP) or other suitable message.

Based on the scan results obtained from the communication device 102, the communication device 104, the BTS 110 and/or the mobile router 114, the cognitive radio controller 120 can identify DSA channels that are presently unused in the geographic region in which the communication device 102 is located and that may be used by the communication device 102 based on its communications capability. The cognitive radio controller 120 also can determine required channel parameters for the communication device 102 based on the data representing the communication device's radio capabilities. For example the cognitive radio controller 120 can determine bandwidth requirements for the communication device 102, and select one or more of the unused DSA channels that may be used by the communication device 102 and best suit the required bandwidth, and/or any other required channel parameters.

The DSA channels can be selected based on their potential to be used as inbound channels and/or outbound channels. As used herein, an inbound channel is a communication channel over which the base station receives communication signals (i.e., inbound communication traffic) transmitted by the communication device, and an outbound channel is a communication channel over which the communication device 102 receives communication signals (i.e., outbound communication traffic).

This potential of the DSA channels to be used for inbound and/or outbound channels may depend upon the separation of the DSA channels from other inbound and outbound channels and/or separation from other DSA channels. The DSA channels also may be selected in such a manner that the use of that channel doesn't cause any interference to incumbent users while providing best possible service to the communication device 102. These DSA channels can be ranked based on channel separation, maximum allowed transmit power, required TX mask, etc. The highest ranked DSA channel then can be selected for operation.

When the cognitive radio controller 120 selects one or more DSA channels to be allocated to the communication device 102, the cognitive radio controller 120 also can select a primary inbound channel, a primary outbound channel and/or one or more additional DSA channels to be allocated to the communication device 102. This selection can be based on the spectral relationships among the primary channels licensed to DSA communication system 100 and opportunistically used DSA channels in order to ensure that required frequency separation between channels being used for inbound and outbound communication traffic is maintained.

The cognitive radio controller 120 also can identify inbound and/or outbound communication traffic of the communication device 102 that can be moved partially or completely to the selected DSA channel(s), and move the traffic accordingly. When only a portion of inbound or outbound communication traffic is moved to a DSA channel, the other portion(s) of such traffic may be allocated to a primary channel (e.g., a channel that is licensed to the DSA communication system 100 and/or a secondary system) and/or to one or more other DSA channels.

By way of example, if a single DSA channel is selected, all of the inbound communication traffic can be moved to the DSA channel while the outbound communication traffic is maintained on a primary channel (licensed to the DSA communication system 100). In another example, all of the outbound communication traffic can be moved to the DSA channel while the inbound communication traffic is maintained on a primary channel. In other arrangements, a portion of the inbound communication traffic can be moved to the DSA channel, and/or a portion of the outbound communication traffic can be moved to the DSA channel. In this regard, the DSA communication system 100 can use both licensed communication frequency spectrums and use one or more unlicensed frequency spectrums opportunistically to establish one or more DSA channels. Accordingly, the bandwidth available for use in the DSA communication system 100 can be selectively increased when the opportunity to use the unlicensed frequency spectrum(s) arises.

If a plurality of DSA channels are selected, both the inbound communication traffic and outbound communication traffic can be moved partially or completely to the DSA channels, though this need not be the case. For instance, it may be determined to only move inbound communication traffic partially or completely to the DSA channels, or to only move outbound communication traffic partially or completely to the DSA channels.

Examples presenting various combinations in which primary and DSA channels may be allocated in accordance with the inventive arrangements are presented in Table 1. In Table 1, a "single channel" FDD channel configuration is a configuration in which a single channel is allocated for inbound communication traffic and a single channel is allocated for outbound communication traffic. A "multi-channel" FDD channel configuration is a configuration in which a plurality of channels are allocated for inbound communication traffic and/or outbound communication traffic.

By way of example, when a plurality of channels are allocated for inbound communication traffic, each channel can carry a portion of the inbound communication traffic. The plurality of channels allocated for inbound communication traffic can comprise a primary channel and one or more DSA channels, or the plurality of channels can comprise two or more DSA channels. Similarly, when a plurality of channels are allocated for outbound communication traffic, each channel can carry a portion of the outbound communication traffic. This plurality of channels allocated for outbound communication traffic also can comprise a primary channel and one or more DSA channels, or can comprise two or more DSA channels.

TABLE 1

| FDD Channel Configuration | Inbound communication traffic Allocation | Outbound communication traffic Allocation |
| --- | --- | --- |
| Single Channel | Primary Channel | Primary Channel |
| Single Channel | DSA channel | Primary Channel |
| Single Channel | Primary Channel | DSA channel |
| Single Channel | DSA channel | DSA channel |
| Multi-Channel | Primary Channel | Plurality of Channels |
| Multi-Channel | DSA channel | Plurality of Channels |
| Multi-Channel | Plurality of Channels | Primary Channel |
| Multi-Channel | Plurality of Channels | DSA channel |
| Multi-Channel | Plurality of Channels | Plurality of Channels |

If the communication device 102 or BTS 110 identifies an incumbent user that appears in the DSA channel(s) allocated to the communication device 102, the cognitive radio controller 120 can de-allocate these DSA channel(s) in real time. Further, if one or more DSA channels are exclusively allocated to the communication device 102 for inbound and/or outbound communication traffic, the cognitive radio controller 120 can, in real-time, allocate a suitable primary channel or primary channels to the communication device 102 for the inbound and/or outbound communication traffic. Accordingly, the risk of the communication device's use of the DSA channel(s) interfering with an incumbent user can be mitigated, while present communication links established for the communication device 102 are maintained. In other words, the communication links can be moved from the DSA channel(s) to the primary channel(s) in real-time.

Figure 2:
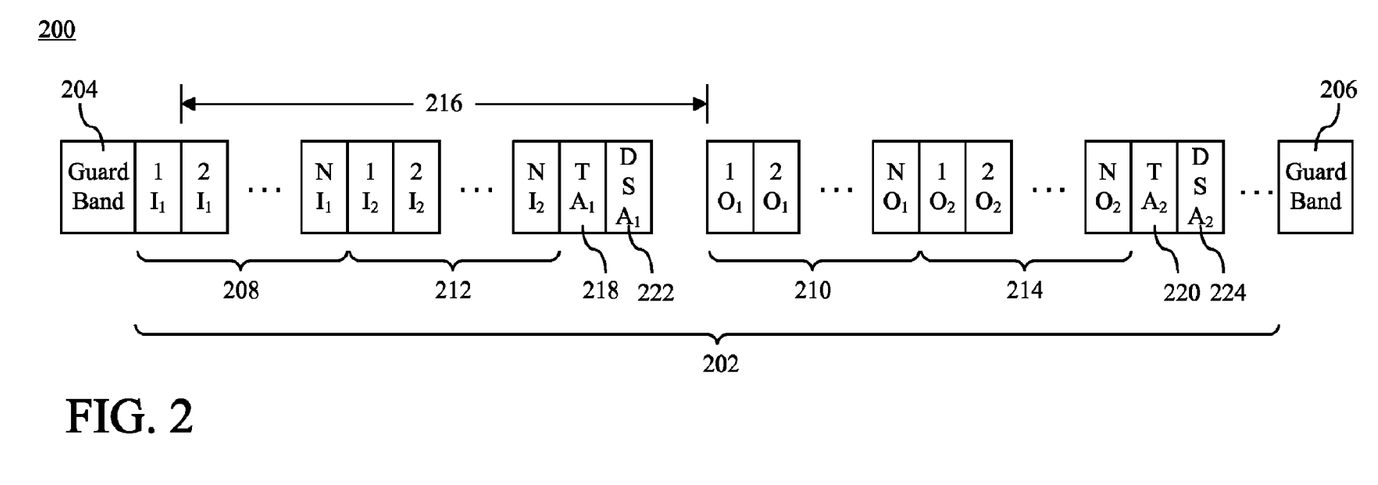
FIG. 2 depicts a frequency allocation plan that is useful for understanding the present invention.

A frequency allocation plan 200 that is useful for understanding selection of the DSA channel(s) is presented in FIG. 2. The frequency allocation plan 200 can define a shared frequency band 202 and guard bands 204, 206. The guard bands 204, 206 can be unused frequency bands that bound the lower and upper portions of the shared frequency band 202, respectively, to prevent crosstalk with other frequency bands.

Within the shared frequency band 202, a plurality of communication channels may be defined and assigned to one or more systems as primary channels in accordance with a frequency allocation plan, which will be discussed herein. For example, a plurality of inbound channels 208 and outbound channels 210 can be defined as primary channels for use by a first communication system, a plurality of inbound channels 212 and outbound channels 214 can be defined as primary channels for use by a second communication system, and so on, wherein one or both the systems can act as DSA communication systems. These typically are fixed channel assignments which are defined at the time of system deployment by a central or regional agency. Thus, use of the terms "first" and "second" in this context should not be confused with the term "secondary" as used the respect to "secondary channel."

When the inbound channels 208, 212 and outbound channels 210, 214 are defined, a minimum amount of frequency separation for each pair of inbound and outbound channels should be maintained in order to prevent crosstalk between the inbound and outbound communication signals. For example, inbound channel 1 allocated to the first system (1, $I_1$) should be separated from outbound channel 1 allocated to that system (1, $O_1$) by a frequency separation 216.

In addition, unpaired channels 218, 220 can be defined for direct wireless communication among two or more communication devices, which is commonly referred to as "talk around." During talk around, the communication devices share the same channel 218 and use that channel 218 in simplex mode for both inbound and outbound communication traffic. Typically, assignment of the channel 218 for use during talk around is a fixed channel assignment.

Further, one or more DSA channels 222, 224 also can be defined. These DSA channels 222, 224 can be used opportunistically by various DSA communication systems for both inbound and outbound communications, so long as the frequency spectrums in which the DSA channels 222, 224 are defined are not presently being used by incumbent systems, which may have primary channels assigned in these frequency spectrums. As noted, it is generally desirable to maintain the required minimum frequency separation 216 between the channels being used for inbound and outbound communications.

Figure 3:
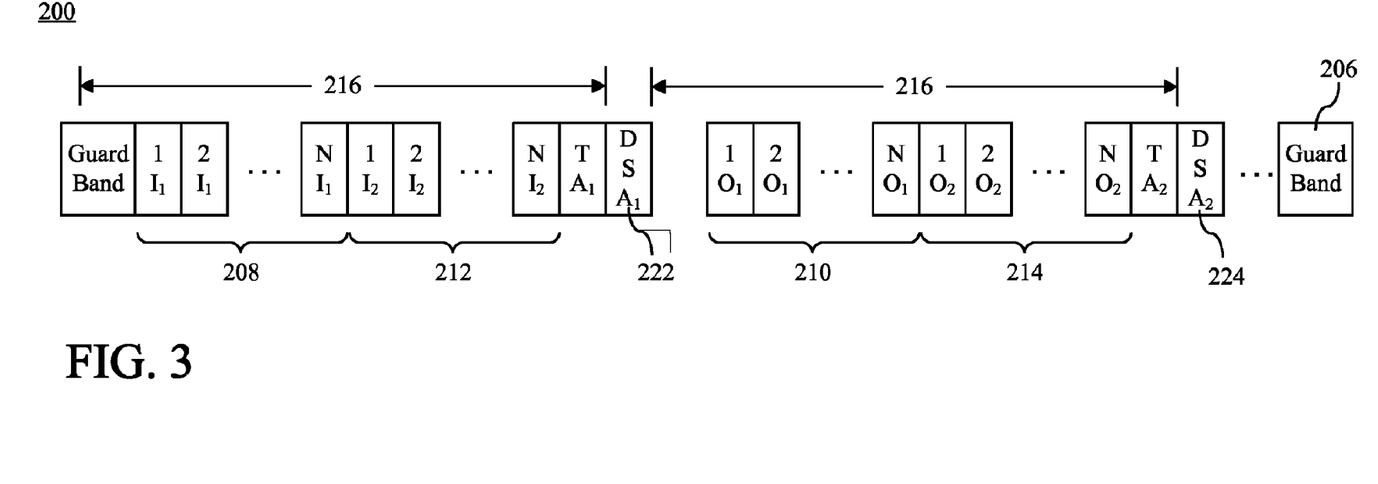
FIG. 3 depicts a frequency allocation plan of FIG. 2.

For example, referring to FIG. 3, none of the inbound channels 208, 212 or outbound channels 210, 214 depicted in the frequency allocation plan 200 are spaced from the DSA channel 222 with the required minimum frequency separation 216. Thus, if the DSA channel 222 is selected for use by the communication device while operating in duplex mode, that channel may only be used in conjunction with the DSA channel 224 or other channels (not shown) between the DSA channel 224 and the guard band 206. On the other hand, the DSA channel 224 is adequately spaced from the inbound channels 208, 212, and thus could be used in conjunction with any of the inbound channels 208, 212 depicted.

Figure 4:
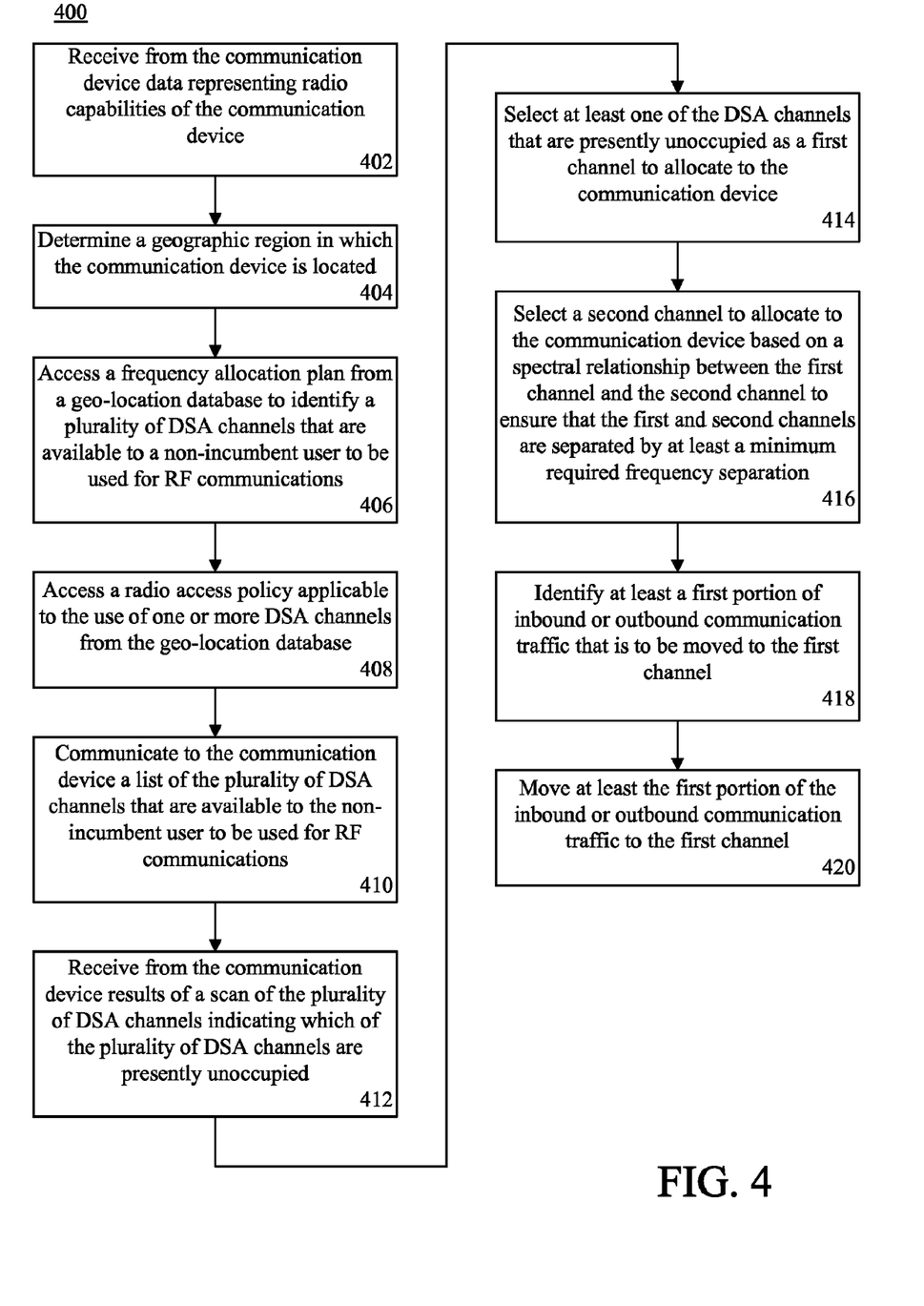
FIG. 4 is a flowchart that is useful for understanding the present invention.

FIG. 4 is a flowchart presenting a method 400 of dynamically allocating RF communication channels to a communication device, which is useful for understanding the present invention. At step 402, data representing radio capabilities of the communication device can be received from the communication device. At step 404, a geographic region in which the communication device is located can be determined, for example as previously described.

At step 406, a frequency allocation plan can be accessed from a geo-location database to identify a plurality of potential DSA channels that are available to a non-incumbent user to be used for RF communications. At step 408, a radio access policy can be accessed from the geo-location database. The radio access policy can be applicable to the use of one or more of the DSA channels by a non-incumbent user.

At step 410, a list of the plurality of DSA channels that are available to the non-incumbent user to be used for RF communications can be communicated to the communication device. At step 412, results of a scan of the plurality of DSA channels can be received from the communication device to indicate which of the plurality of DSA channels are presently unoccupied. The results can include data pertaining to a scan performed by the communication device, other communication devices and/or the BTS.

At step 414, at least one of the DSA channels that are presently unoccupied can be selected as a first channel to allocate to the communication device. In one arrangement, the selection of the DSA channel(s) can be based on at least one required channel parameter. Selection of the DSA channel(s) also may include determining which of the DSA channels are presently unoccupied by another device in the geographic region in which the wireless communication device is located.

At step 416, at least a second channel can be selected to allocate to the communication device. The second channel can be a primary inbound channel, a primary outbound channel, or a DSA channel not selected as the first channel. The selection of the second channel can be based on a spectral relationship between the first channel and the second channel to ensure that the first and second channels are separated by at least a minimum required frequency separation.

At step 418, at least a first portion of inbound or outbound communication traffic can be identified to be moved to the first channel. At step 420, the first portion of the inbound or outbound communication traffic can be moved to the first channel. In one arrangement, one or more other DSA channels can be selected to allocate to the communication device, and at least a second portion of the inbound or outbound communication traffic can be identified to be moved to the third channel.

Figure 5:
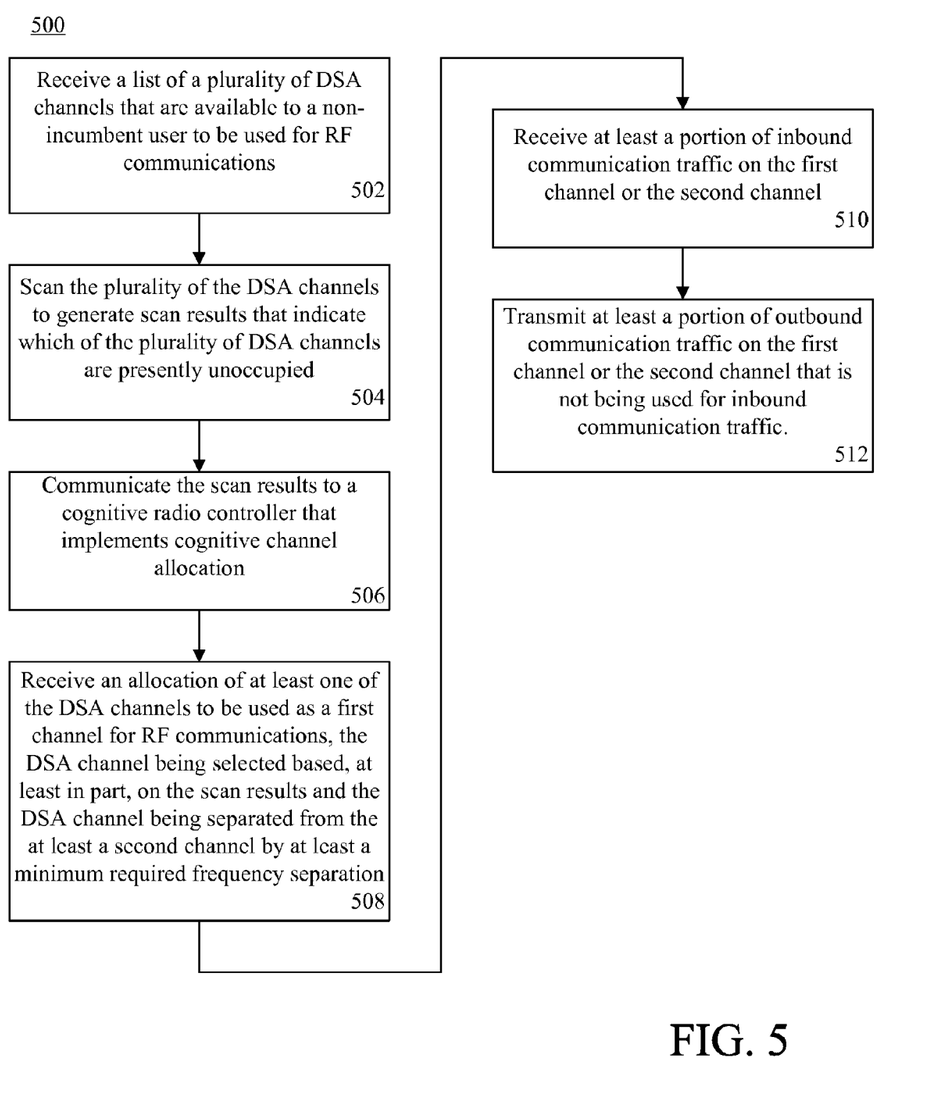
FIG. 5 is another flowchart this is useful for understanding the present invention.

FIG. 5 is a flowchart presenting a method 500 of dynamically communicating over a plurality of RF communication channels, which is useful for understanding the present invention. At step 502, a list of a plurality of DSA channels that are available to a non-incumbent user to be used for RF communications can be received, for example from a cognitive radio controller. At step 504, the plurality of the DSA channels can be scanned to generate scan results that indicate which of the plurality of DSA channels are presently unoccupied. At step 506, the scan results can be communicated to a cognitive radio controller that is configured to implement DSA.

At step 508, an allocation of at least one of the DSA channels to be used as a first channel for RF communications can be received. The DSA channel can be selected based, at least in part, on the scan results, a determination that the DSA channel is separated from a second channel by at least a minimum required frequency separation, communication device capabilities being fulfilled by the DSA channel, and/or any other relevant parameters. At step 510, at least a portion of inbound communication traffic can be received on the first channel or the second channel. At step 512, at least a portion of outbound communication traffic can be transmitted on the first channel or the second channel that is not being used for inbound communication traffic.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embodied in a computer-usable medium, such as a computer program product or other data programs storage device, readable by a machine, tangibly embodying a program of instructions executable by the machine to perform methods and processes described herein. The present invention also can be embodied in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

As used herein, the term "real time" means a level of processing responsiveness that a user or system senses as sufficiently immediate for a particular process or determination to be made, or that enables the processor to keep up with some external process.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of dynamically allocating RF communication channels to a wireless communication device, comprising:
   identifying a plurality of dynamic spectrum allocation (DSA) channels that are available to a non-incumbent user to be used for RF communications;
   based on at least one required channel parameter, selecting at least one of the DSA channels as a first channel to allocate to the wireless communication device; and
   selecting at least a second channel to allocate to the wireless communication device based on a spectral relationship between the first channel and the second channel to ensure that the first and second channels are separated by at least a minimum required frequency separation for preventing crosstalk.

2. The method of claim 1, further comprising:
   determining a geographic region in which the wireless communication device is located;
   wherein selecting at least one of the DSA channels as the first channel comprises determining which of the DSA channels are presently unoccupied by another device in the geographic region in which the wireless communication device is located.

3. The method of claim 1, wherein selecting at least the second channel comprises:
   selecting the second channel from a group consisting of a primary inbound channel, a primary outbound channel, a DSA channel not selected as the first channel.

4. The method of claim 1, further comprising:
   identifying at least a first portion of inbound or outbound communication traffic that is to be moved to the first channel; and
   moving the first portion of the inbound or outbound communication traffic to the first channel.

5. The method of claim 4, further comprising:
   maintaining a second portion of the inbound or outbound communication traffic on a primary channel.

6. The method of claim 4, further comprising:
   based on the at least one required channel parameter, selecting at least one other of the DSA channels as a third channel to allocate to the wireless communication device;
   identifying at least a second portion of the inbound or outbound communication traffic that is to be moved to the third channel; and
   moving the second portion of the inbound or outbound communication traffic to the third channel.

7. The method of claim 1, further comprising:
   accessing a frequency allocation plan from a geo-location database;

wherein identifying the plurality of DSA channels that are available to the non-incumbent user to be used for RF communications comprises identifying the DSA channels from the frequency allocation plan.

8. The method of claim 1, further comprising:

accessing at least one radio access policy applicable to use of the DSA channels;

wherein selecting at least the DSA channel to allocate to the wireless communication device is further based, at least in part, on the radio access policy.

9. The method of claim 1, further comprising:

receiving from the wireless communication device data representing radio capabilities of the wireless communication device;

wherein selecting at least the DSA channel to allocate to the wireless communication device is further based, at least in part, on the radio capabilities.

10. The method of claim 1, further comprising:

communicating to the wireless communication device a list of the plurality of DSA channels that are available to the non-incumbent user to be used for RF communications; and receiving from the wireless communication device results of a scan of the plurality of DSA channels indicating which of the plurality of DSA channels are presently unoccupied;

wherein selecting at least the DSA channel to allocate to the wireless communication device is further based, at least in part, on the results of the scan.

11. A dynamic spectrum allocation (DSA) communication system, comprising:

a cognitive radio controller that:

identifies a plurality of DSA channels that are available to a non-incumbent user to be used for RF communications;

based on at least one required channel parameter, selects at least one of the DSA channels as a first channel to allocate to the wireless communication device; and selects at least a second channel to allocate to a wireless communication device based on a spectral relationship between the first channel and the second channel to ensure that the first and second channels are separated by at least a minimum required frequency separation for preventing crosstalk.

12. The DSA communication system of claim 11, wherein the cognitive radio controller is configured to receive from the wireless communication device data representing radio capabilities of the wireless communication device and selects the DSA channel to allocate to the wireless communication device based, at least in part, on the radio capabilities.

13. The DSA communication system of claim 11, wherein the cognitive radio controller is configured to:

communicate to the wireless communication device a list of the plurality of DSA channels that are available to the non-incumbent user to be used for RF communications;

receive from the wireless communication device results of a scan of the plurality of DSA channels indicating which of the plurality of DSA channels are presently unoccupied; and select the DSA channel to allocate to the wireless communication device based, at least in part, on the results of the scan.

14. The DSA communication system of claim 11, wherein the cognitive radio controller determines a geographic region in which the wireless communication device is located and determines which of the DSA channels are presently unused in the geographic region in which the wireless communication device is located.

15. The DSA communication system of claim 11, wherein the cognitive radio controller selects the second channel from a group consisting of a primary inbound channel, a primary outbound channel, and a DSA channel not selected as the first channel.

16. The DSA communication system of claim 11, wherein the cognitive radio controller identifies at least a first portion of inbound or outbound communication traffic that is to be moved to the first channel and moves the first portion of the inbound or outbound communication traffic to the first channel.

17. The DSA communication system of claim 16, wherein the cognitive radio controller maintains a second portion of the inbound or outbound communication traffic on a primary channel.

18. The DSA communication system of claim 16, wherein the cognitive radio controller is configured to:

select at least one other of the DSA channels as a third channel to allocate to the wireless communication device based on the at least one required channel parameter;

identify at least a second portion of the inbound or outbound communication traffic that is to be moved to the third channel; and move the second portion of the inbound or outbound communication traffic to the third channel.

19. The DSA communication system of claim 11, wherein the cognitive radio controller is configured to access a frequency allocation plan from a geo-location database to identify the DSA channels.

20. The DSA communication system of claim 11, wherein the cognitive radio controller is configured to access at least one radio access policy applicable to use of the DSA channels and selects the DSA channel to allocate to the wireless communication device based, at least in part, on the radio access policy.

\* \* \* \* \*